United States Patent
Tamura

(10) Patent No.: US 11,938,933 B2
(45) Date of Patent: Mar. 26, 2024

(54) TRAVEL CONTROL APPARATUS, VEHICLE, TRAVEL CONTROL METHOD, AND NON-TRANSITORY COMPUTER-READABLE STORAGE MEDIUM

(71) Applicant: HONDA MOTOR CO., LTD., Tokyo (JP)

(72) Inventor: Sho Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 17/189,500

(22) Filed: Mar. 2, 2021

(65) Prior Publication Data
US 2021/0291830 A1 Sep. 23, 2021

(30) Foreign Application Priority Data
Mar. 17, 2020 (JP) .................. 2020-046811

(51) Int. Cl.
*B60W 30/12* (2020.01)
*G06V 20/56* (2022.01)

(52) U.S. Cl.
CPC .......... *B60W 30/12* (2013.01); *G06V 20/588* (2022.01); *B60W 2420/403* (2013.01); *B60W 2552/53* (2020.02); *B60W 2556/40* (2020.02); *B60W 2556/50* (2020.02)

(58) Field of Classification Search
CPC ............. B60W 30/12; B60W 2556/50; B60W 2552/53; B60W 2556/40; B60W 2420/42; G06V 20/588
USPC ........................................................ 701/28
See application file for complete search history.

(56) References Cited

U.S. PATENT DOCUMENTS 9,123,152 B1 * 9/2015 Chatham .................. G01S 19/13
9,483,700 B1 * 11/2016 Chen ..................... G06V 20/588
2010/0138115 A1 * 6/2010 Kageyama .......... B60R 21/0134
701/45

(Continued)

FOREIGN PATENT DOCUMENTS

CN 108297866 * 7/2018
JP 2019-156195 A 9/2019

OTHER PUBLICATIONS

Norman Mattern, Camera-based Vehicle Localization at Intersections using Detailed Digital Maps, May 6, 2010, IEEE ION Position, Location, and Navigation Symposium (Year: 2010).*

*Primary Examiner* — Elaine Gort
*Assistant Examiner* — Matthias S Weisfeld
(74) *Attorney, Agent, or Firm* — Thomas| Horstemeyer, LLP

(57) ABSTRACT

There is provided a travel control apparatus. A control unit performs, based on a recognition result of a recognition unit and map information of a periphery of the moving body, travel control of the moving body. A first determination unit determines whether a first state is set. A second determination unit determines whether a second state is set. In at least one of a case in which the first determination unit determines that the first state is set and a case in which the second determination unit has determined that the second state is set, the control unit performs travel control prioritizing the recognition result of the recognition unit over the map information.

8 Claims, 6 Drawing Sheets

(56) References Cited

U.S. PATENT DOCUMENTS

| | | | |
|---|---|---|---|
| 2014/0062785 A1* | 3/2014 | Kim | G01S 13/931 |
| | | | 342/368 |
| 2018/0189590 A1* | 7/2018 | Fuchigami | G06V 20/588 |
| 2019/0135341 A1* | 5/2019 | Kumano | B62D 15/025 |
| 2019/0279004 A1* | 9/2019 | Kwon | G06N 5/046 |
| 2019/0286140 A1 | 9/2019 | Miura et al. | |
| 2020/0160703 A1* | 5/2020 | Augst | G08G 1/0112 |
| 2020/0247407 A1* | 8/2020 | Huang | G01C 21/3658 |
| 2021/0138904 A1* | 5/2021 | Ono | B60K 35/10 |

* cited by examiner

TRAVEL CONTROL APPARATUS, VEHICLE, TRAVEL CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2020-046811 filed on Mar. 17, 2020, the entire disclosure of which is incorporated herein by reference.

BACKGROUND OF THE INVENTION

Field of the Invention

The present invention relates to a travel control apparatus, a vehicle, a travel control method, and a non-transitory computer-readable storage medium.

Description of the Related Art

A vehicle that can recognize a lane of a road on which the self-vehicle is traveling and can perform travel control based on the recognized lane is known. Japanese Patent Laid-Open No. 2019-156195 discloses a technique for confirming, by using a camera, the presence of a section of a road undergoing construction, and obtaining, if the presence of the section of the road construction is confirmed, the travel environment information of the section of the road construction from a map or the like.

SUMMARY OF THE INVENTION

According to one embodiment of the present invention, there is provided a travel control apparatus comprising: a recognition unit configured to recognize, based on an image captured by a camera provided in a moving body, a lane on which the moving body is traveling; a control unit configured to perform, based on a recognition result of the recognition unit and map information of a periphery of the moving body, travel control of the moving body; a first determination unit configured to determine whether a first state, in which a first angular difference, between a lane recognized by the recognition unit and a lane based on the map information, in a first range which is ahead of the moving body is continuously not less than a first threshold, is set; and a second determination unit configured to determine whether a second state, in which a second angular difference, between a lane recognized by the recognition unit and a lane based on the map information in a second range which is ahead of the moving body and is closer to the side of the moving body than the first range is not less than a second threshold, is set, wherein in at least one of a case in which the first determination unit determines that the first state is set and a case in which the second determination unit has determined that the second state is set, the control unit performs travel control prioritizing the recognition result of the recognition unit over the map information.

According to another embodiment of the present invention, there is provided a travel control method comprising: recognizing, based on an image captured by a camera provided in a moving body, a lane on which the moving body is traveling; performing, based on a recognition result obtained in the recognizing and map information of a periphery of the moving body, travel control of the moving body; performing a first determination as to whether a first state, in which a first angular difference, between a lane recognized in the recognizing and a lane based on the map information, in a first range which is ahead of the moving body is continuously not less than a first threshold, is set; and performing a second determination as to whether a second state, in which a second angular difference, between a lane recognized in the recognizing and a lane based on the map information, in a second range which is ahead of the moving body and is closer to the side of the moving body than the first range is not less than a second threshold, is set, wherein in the performing the travel control, in at least one of a case in which a state in which the first state is set is determined in the performing the first determination and a case in which a state in which the second state is set is determined in the performing the second determination, travel control prioritizing the recognition result over the map information is performed.

According to still another embodiment of the present invention, there is provided a non-transitory computer-readable storage medium storing a program for causing a computer to function as each unit of a recognition unit configured to recognize, based on an image captured by a camera provided in a moving body, a lane on which the moving body is traveling; a control unit configured to perform, based on a recognition result of the recognition unit and map information of a periphery of the moving body, travel control of the moving body; a first determination unit configured to determine whether a first state, in which a first angular difference, between a lane recognized by the recognition unit and a lane based on the map information, in a first range which is ahead of the moving body is continuously not less than a first threshold, is set; and a second determination unit configured to determine whether a second state, in which a second angular difference, between a lane recognized by the recognition unit and a lane based on the map information, in a second range which is ahead of the moving body and is closer to the side of the moving body than the first range is not less than a second threshold, is set, wherein in at least one of a case in which the first determination unit determines that the first state is set and a case in which the second determination unit has determined that the second state is set, the control unit performs travel control prioritizing the recognition result of the recognition unit over the map information.

DESCRIPTION OF THE EMBODIMENTS

Figure 1:
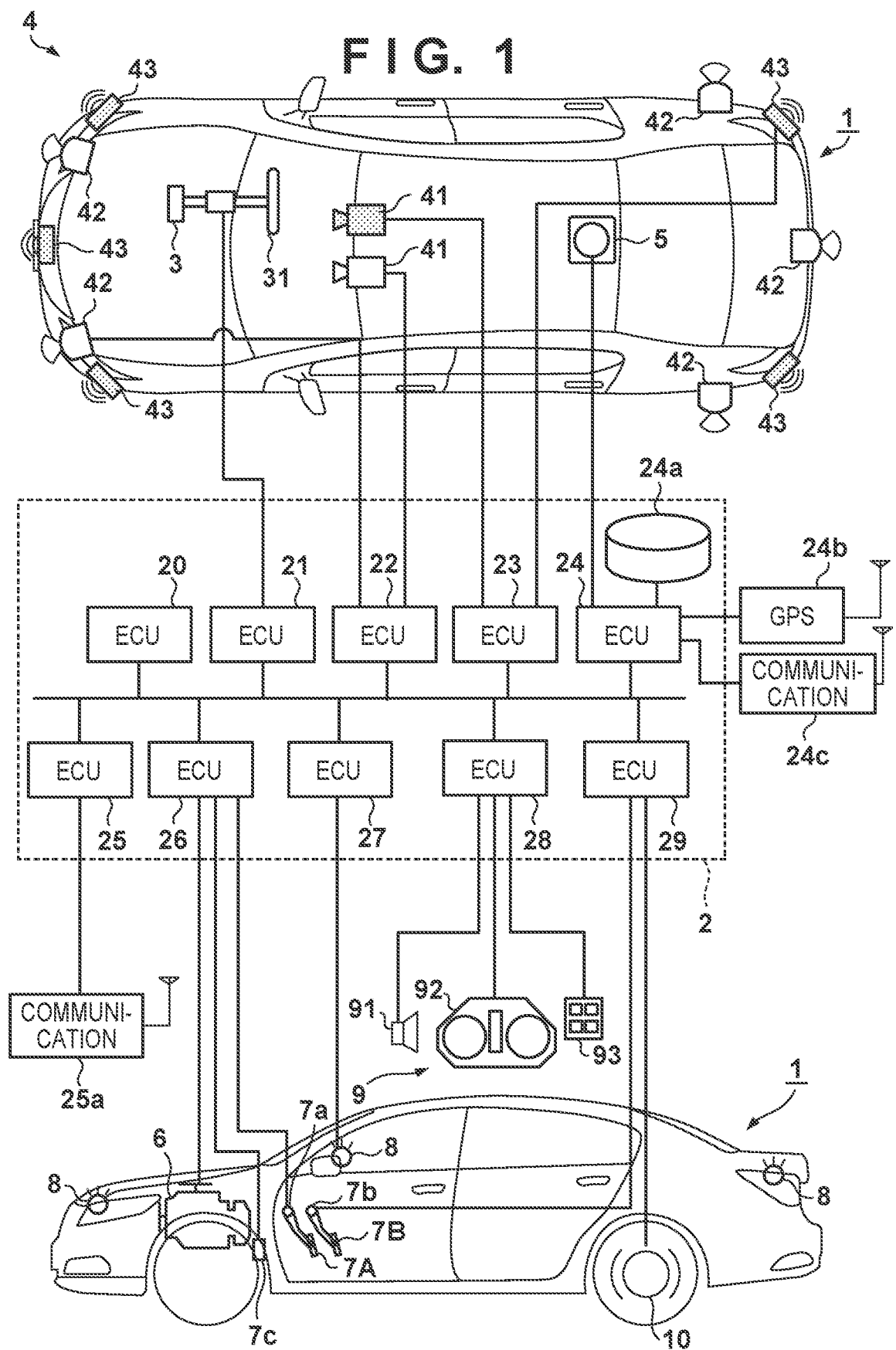
FIG. 1 is a block diagram of a vehicle control apparatus according to an embodiment.

For example, when division lines are redrawn on a road after road construction, the positions of the division lines may change from those of the road before the construction. In such a case, if the change in the division lines due to the construction is not reflected in map information, the shapes of the division lines recognized by a camera and the shape of the division lines based on the map information will not match. That is, the matching of the map information and the information obtained by the camera will fail. The accuracy of travel control performed in such a case has room for improvement.

An embodiment of the present invention provides a technique for improving the accuracy of travel control performed in a case in which the map information and the information obtained by the camera do not match.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle. Note that in the following description, the left and right directions are based on a state facing the direction of forward movement of the vehicle 1. Also, although a four-wheeled vehicle will be exemplified in this embodiment, the arrangement according to this embodiment can be adopted by a straddle-type vehicle such as a motorcycle, other moving bodies capable of moving on a road, and the like.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, each ECU may include a dedicated integrated circuit such as an ASIC or the like for executing the processing of each ECU instead of these components.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, the ECU 20 will execute control to stop the vehicle 1 by automatically controlling at least the steering of the vehicle 1. In this manner, from one aspect, the ECU 20 functions as a travel control apparatus of the vehicle 1.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7*a* provided on an accelerator pedal 7A, or switches the gear ratio of the transmission based on information such as a vehicle speed detected by a vehicle speed sensor 7*c*. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7*b* provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stationary state of the vehicle 1. In addition, if the transmission of the power plant 6 includes a parking lock mechanism, it can be operated to maintain the stationary state of the vehicle 1.

<Switching of Travel Mode>

Figure 2:
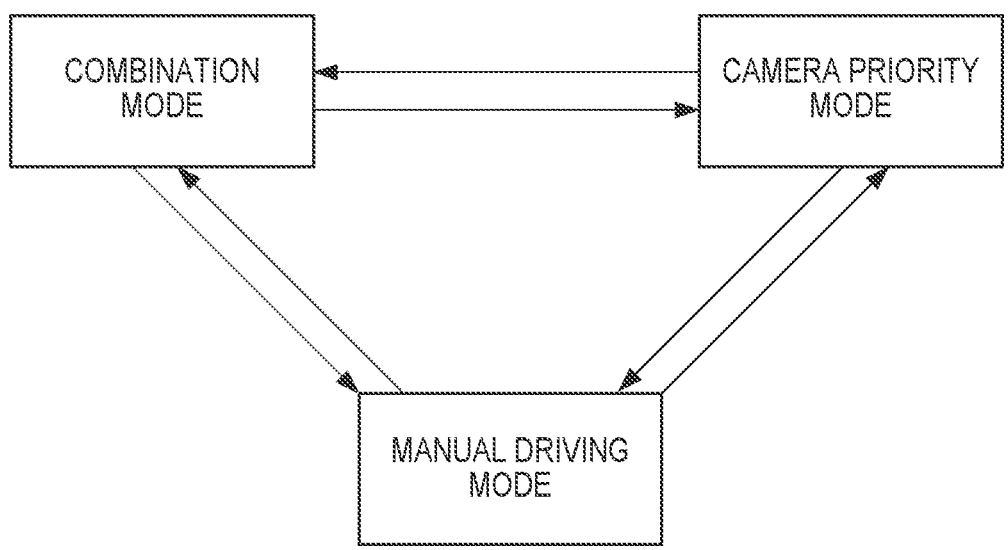
FIG. 2 is a view for explaining travel mode switching by a control unit.

FIG. 2 is a view showing travel control mode switching of the vehicle 1 performed by the control unit 2. In this embodiment, the control unit 2 controls the travel of the vehicle 1 by switching the control mode between a manual driving mode, a combination mode, and camera priority mode.

The manual driving mode is a mode in which the driver performs manual driving. In other words, the manual driving mode is a control mode in which automated control of steering and acceleration/deceleration of the vehicle 1 is not performed by the control unit 2. In this mode, for example, the electric power steering device 3, the power plant 6, the brake device 10, and the like are controlled by the corresponding ECUs in the control unit 2 in accordance with the operation of the steering wheel 31, the accelerator pedal 7A, and the brake pedal 7B by the driver.

The combination mode is a mode in which travel control is performed by using the map information and the information obtained by the cameras 41 in combination in a state in which these pieces of information are matched. More specifically, in this mode, the control unit 2 performs travel control in a state in which the map information obtained by the communication device 24*c* and the information of a lane recognized based on images or the like captured by the cameras 41 have been determined to be consistent with each other. In one embodiment, the control unit 2 may compare the shape of the lane ahead of the vehicle 1 obtained based on the images or the like captured by the cameras 41 and the shape of the lane ahead of the vehicle 1 based on the map information and the information of the current position obtained by the GPS sensor 24*b* or the like. Subsequently, if these shapes match or the difference between these shapes fall within a tolerable range, the control unit 2 can determine that the map information and the information obtained by the cameras 41 are consistent with each other, that is, that these pieces of information match.

An example of travel control performed by the control unit 2 in the combination mode is, for example, lane maintenance control in which the vehicle 1 is controlled to travel in the center of the travel lane. Note that since the control unit 2 will use both the map information and the information obtained by the cameras 41 in the combination mode, travel control can be executed highly accurately. Hence, in the combination mode, the control unit 2 may execute the travel control in a "hands-off" state in which the driver is not requested to grip the steering wheel.

The camera priority mode is a mode in which travel control is performed by prioritizing the information obtained by the cameras 41 over the map information. In this mode, for example, if the map information and the information obtained by the cameras 41 are not determined to be consistent with each other or if the map information cannot be obtained, the control unit 2 will execute travel control by prioritizing the information obtained by the cameras 41. An example of travel control to be performed by the control unit 2 in the camera priority mode is, for example, the lane maintenance control in which the vehicle 1 is controlled to travel in the center of the travel lane. Note that in the camera priority mode, the control unit 2 can execute travel control in a "hands-on" state in which the driver is requested to grip the steering wheel.

Note that although not shown in FIG. 2, the control unit 2 may also include a travel mode that prioritizes the map information in a case in which consistency cannot be established between the map information and the information obtained by the cameras 41, a case in which the lane cannot be recognized by the cameras, or the like.

In addition, it is possible to appropriately set which piece of information, among the pieces of map information and the information obtained from the cameras, is to be prioritized when the map information and the information obtained by the cameras 41 are not consistent with each other. For example, if the difference between the map information and the information obtained by the cameras 41 is comparatively small, it is possible to consider that the road width has temporarily decreased due to construction or that the redrawing of the division lines after the construction has generated a difference between the map information and the actual lane. Hence, in such cases, the control unit 2 may execute travel control based on the current state of the periphery by using the camera priority mode. On the other hand, if the difference between the map information and the information obtained by the cameras 41 is comparatively large, it is possible to consider that a lane detection error has occurred in the camera or the like. Hence, in such a case, travel control may be performed based on the known road information by using the map priority mode.

In this embodiment, the control unit 2 performs travel control by switching the travel mode between the manual driving mode, the combination mode, and the camera priority mode described above. For example, the control unit 2 can switch to the combination mode when it is determined that an occupant has made an operation such as turning on a switch to start automated driving and that the map information and the information obtained by the cameras 41 match in the manual driving mode. Also, for example, in the manual driving mode, the control unit 2 may switch to the camera priority mode when it is determined that the occupant has made an operation such as turning on the switch to start automated driving and that the cameras can recognize the division lines even though the map information and the information obtained by the cameras have not been matched. Also, for example, the control unit 2 may switch to the camera priority mode when it is determined that the cameras 41 are recognizing the division lines even though the map information and the information obtained by the cameras have stopped matching in the combination mode. In addition, for example, the control unit 2 may switch to the manual driving mode when the cameras become unable to recognize the division lines while one of the combination mode and the camera priority mode is set. Note that in a case in which the travel mode is to be switched from one of the combination mode and the camera priority mode to the manual driving mode, the control unit 2 may request (takeover request) the driver to switch to manual driving.

<Explanation of Shape of Lane Based on Map Information and Information Obtained by Cameras>

Figure 3C:
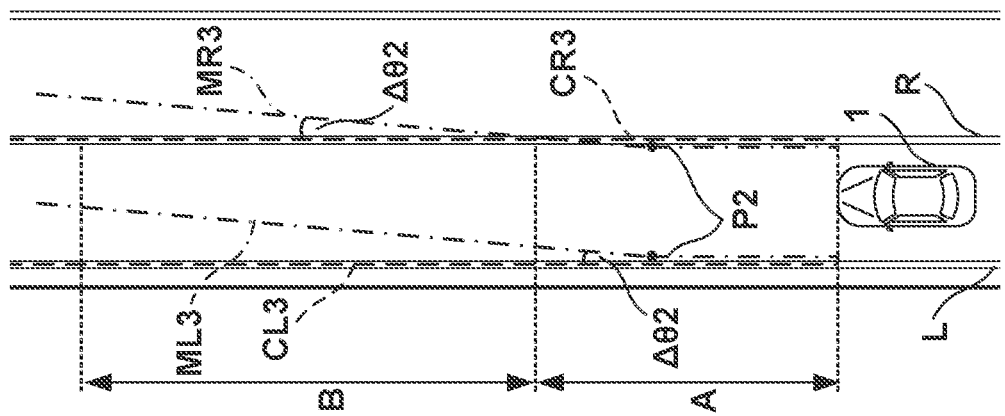
FIG. 3C is a view for explaining the shape of the lane based on the map information and the information obtained by the camera.
Figure 3B:
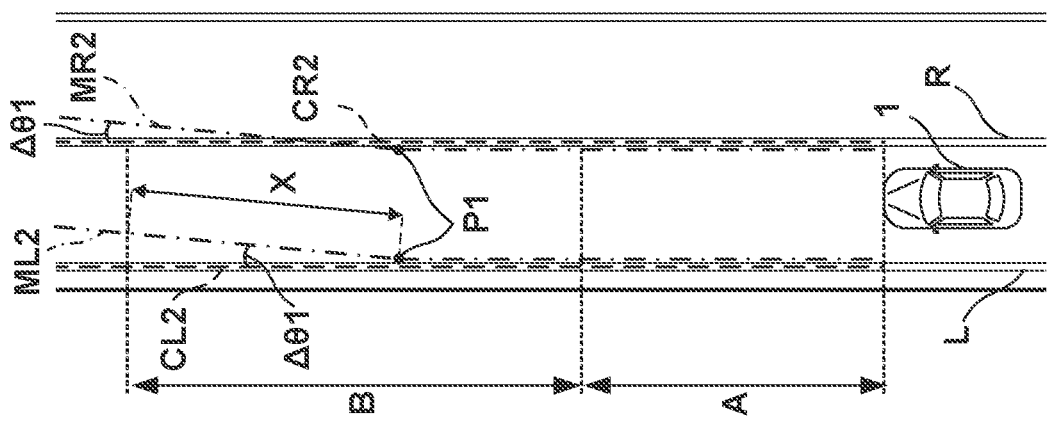
FIG. 3B is a view for explaining the shape of the lane based on the map information and the information obtained by the camera.
Figure 3A:
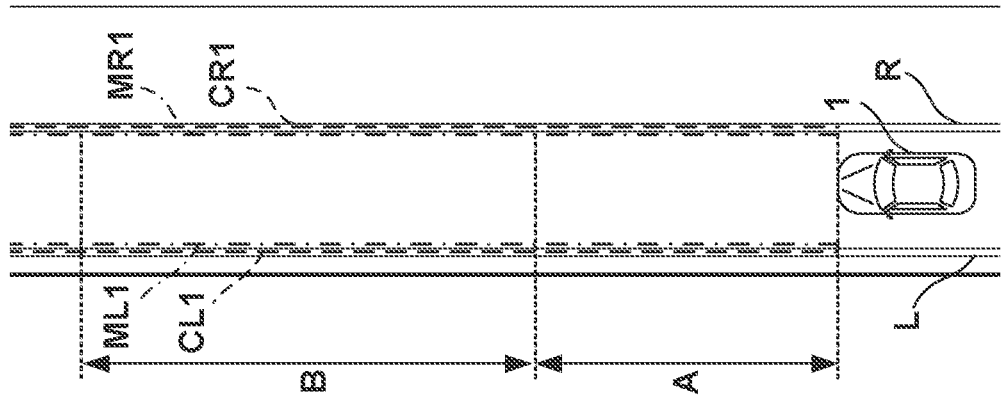
FIG. 3A is a view for explaining the shape of a lane based on map information and information obtained by a camera.

FIGS. 3A to 3C are views for explaining the shape of the lane based on the map information and the information obtained by the cameras 41. In this embodiment, the control unit 2 executes lane shape comparison based on the map information and the information obtained by the cameras 41 of each of a distant section B, which is ahead of the vehicle 1 as the self-vehicle, and a nearby section A, which is ahead of the vehicle 1 but is closer to the side of the vehicle 1 than the distant section B. Subsequently, the control unit 2 determines, based on the result of the comparison, whether the map information and the information obtained by the cameras 41 match.

FIG. 3A shows a state in which the map information and the information obtained by the cameras 41 have matched. In FIG. 3A, in both the nearby section A and the distant section B, the shapes of left and right lanes L and R of the actual road, the shapes of left and right lanes ML1 and MR1 based on the map information, and the shapes of left and right lanes CL1 and CR1 based on the information obtained by the cameras 41 match each other.

FIG. 3B shows a state in which the map information and the information obtained by the cameras 41 do not match in the distant section B. More specifically, although lanes ML2 and MR2 based on the map information and lanes CL2 and CR2 based on information obtained by the cameras 41 match, respectively, in the nearby section A, a difference of Δθ1° has occurred between the lanes ML1 and MR2 and the lanes CL2 and CR2 from a point P1, as a starting point, in the distant section B and beyond. More specifically, in FIG. 3B, although the shapes of the lanes CL2 and CR2 correspond to the shapes of the actual lanes L and R, respectively, the shapes the lanes ML1 and MR2 from the point P1, as the starting point, in the distant section B and beyond differs from the shapes of the actual lanes L and R.

FIG. 3C shows a state in which the map information and the information obtained by the cameras 41 do not match in the nearby section A. More specifically, a difference of Δθ2° has occurred between lanes ML3 and MR3 based on the map information and lanes CL3 and CR3 based on information obtained by the cameras, respectively, in the nearby section A. More specifically, in FIG. 3C, although the shapes of the lanes CL3 and CR3 correspond to the shapes of the actual lanes L and R, respectively, the shapes of the lanes ML3 and MR3 from a point P2 in the nearby section A to the distant section B differs from the shapes of the actual lanes L and R.

In one embodiment, the nearby section A may be a section which is 0 m to 30 m ahead of the self-vehicle, and the distant section B may be a section which is 0 m to 100 m ahead of the self-vehicle. Also, in one embodiment, the nearby section A and the distant section B may partially overlap each other. For example, the nearby section A may be a section which is 0 m to 40 m ahead of the self-vehicle, and the distant section B may be a section which is 30 m to 100 m ahead of the self-vehicle. That is, the nearby section A suffices to include an area which is closer to the side of the self-vehicle than the distant section B. In addition, although an upper limit has been defined in the distance from the vehicle 1 of the distant section B in the examples shown in FIGS. 3A to 3C, no upper limit may be defined in the distance from the vehicle 1 of the distant section B. In such a case, the recognition limit distance of each camera 41 can correspond to the upper limit of the distance from the vehicle 1 of the distant section B. From one aspect, a section from the vehicle 1 to a predetermined position ahead of the vehicle 1 can correspond to the nearby section A, and a section further ahead from the predetermined position ahead of the vehicle 1 can correspond to the distant section B.

Note that although division lines have been illustrated as the left and right lanes L and R of the actual road in FIGS. 3A to 3C, the components of the lane are not limited to the division lines and may be road boundaries such as curbstones, guardrails, and the like.

In this embodiment, the control unit 2 determines whether the map information and the information obtained by the cameras 41 match in each of the nearby section A and the distant section B, and selects, based on this determination result, the travel mode to be used in the travel control of the vehicle 1. An example of this processing will be described hereinafter.

<Processing Example of Control Unit>

Figure 4:
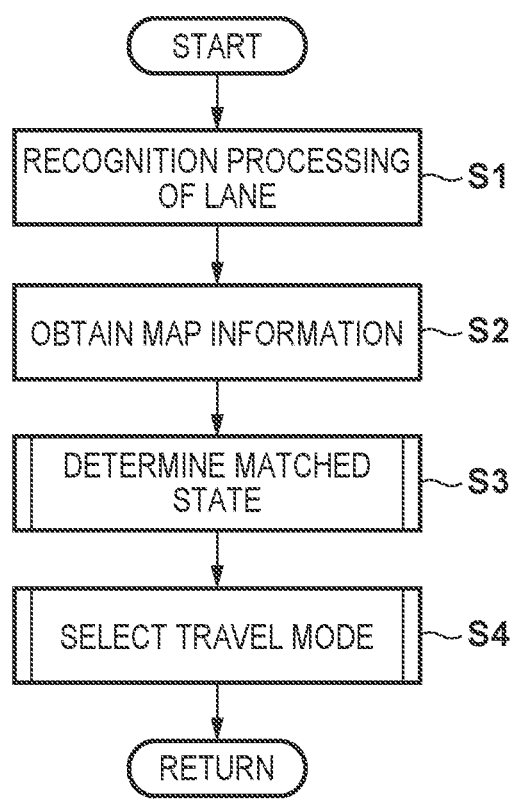
FIG. 4 is a flowchart showing an example of processing of the control unit.

FIG. 4 is a flowchart showing an example of the processing of the control unit 2, and shows an example of travel mode selection processing of the vehicle 1. More specifically, FIG. 4 shows an example of the processing performed in a case in which the control unit 2 is to switch between the combination mode and the camera priority mode in accordance with the situation when automated driving control of the vehicle 1 is to be performed. The control unit 2 can periodically execute this processing while the automated driving control is executed.

In addition, the processing of FIG. 4 is implemented by, for example, the processor of each ECU of the control unit 2 executing a program stored in the ECU. Alternatively, at least the processes of some of the steps may be executed by dedicated hardware (for example, a circuit).

In step S1, the ECU 22 performs division line recognition processing. For example, the ECU 22 recognizes, based on the detection result of the corresponding camera 41 or the like, the division lines of the road on which the vehicle 1 is traveling. Also, for example, the ECU 22 obtains, based on the recognition result, various kinds of information such as the line type, the width, and the angle of each division line, and the like. Note that other than the division lines, the ECU 22 can recognize road boundaries such as guardrails, curbstones, and the like.

In step S2, the ECU 24 obtains the map information of the periphery of the vehicle 1 via the communication device 24c. More specifically, the ECU 24 obtains various kinds of information such as the line type, the width, and the angle of each division line of the road on which the vehicle 1 is traveling. The ECU 24 can also use the GPS sensor 24b to obtain the current position of the vehicle 1. Note that the map information is not limited to the information obtained by the communication device 24c, and the map information that has been stored in a storage device or the like in the vehicle 1 may also be used.

In step S3, the ECU 20 determines, based on the processes of steps S1 and S2, whether the map information and the information obtained by the cameras 41 are in a matched state. Subsequently, in step S4, the ECU 20 selects the travel mode based on the process of step S3, and ends the first processing cycle. The processes of steps S3 and S4 will be described in detail later.

Figure 5A:
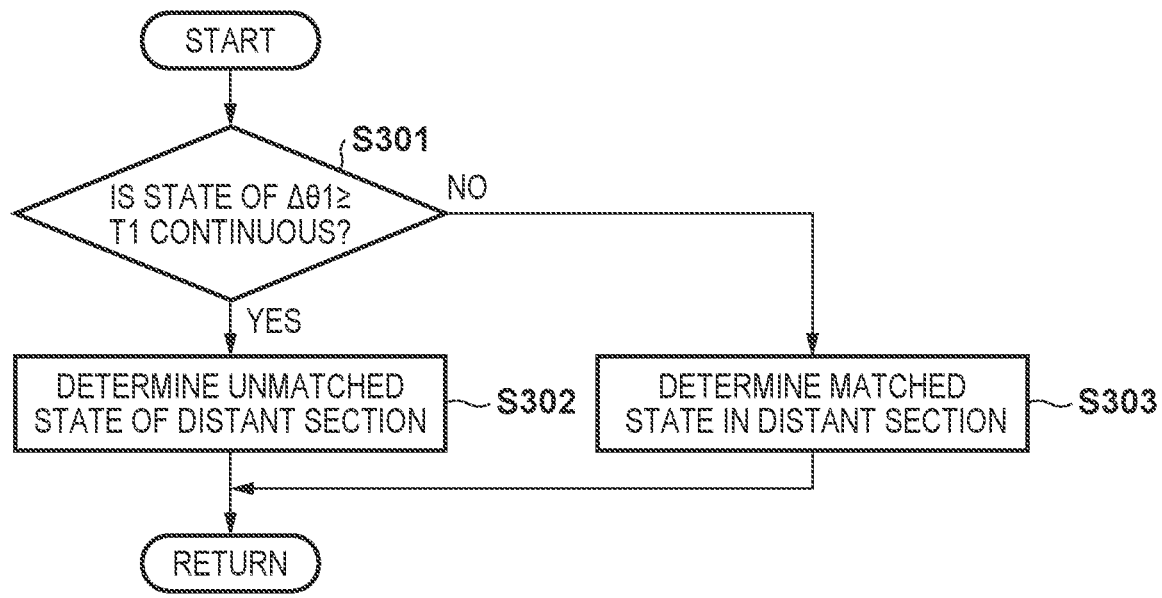
FIG. 5A is a flowchart showing an example of the processing of the control unit.
Figure 5B:
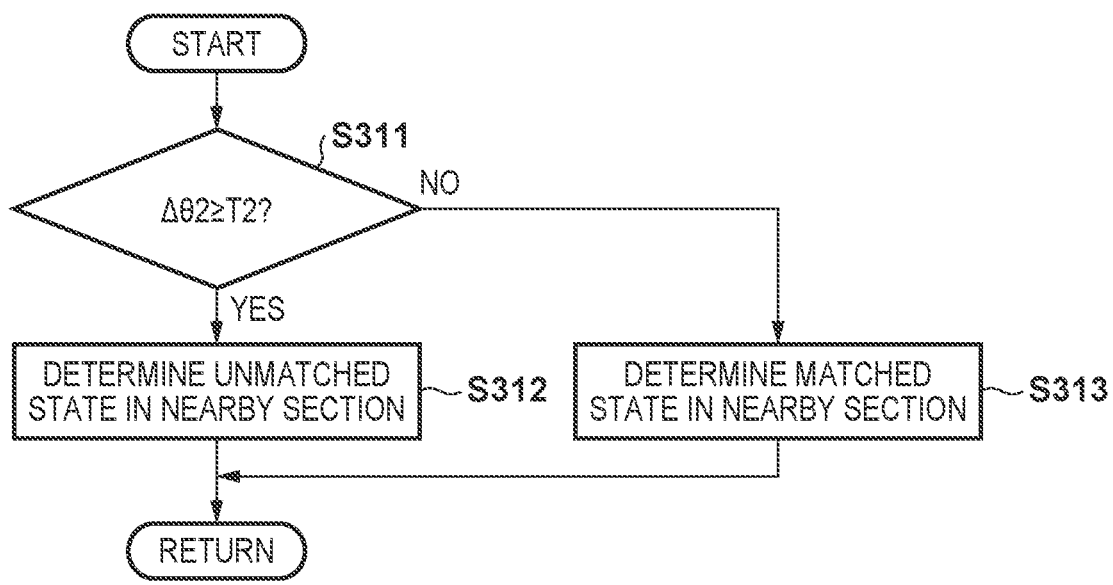
FIG. 5B is a flowchart showing an example of the processing of the control unit.

FIGS. 5A and 5B are flowcharts showing the subroutine of the process of step S3 of FIG. 4. The control unit 2 executes the processing of FIGS. 5A and 5B in series or in parallel.

The processing of FIG. 5A will be described first.

In step S301, the ECU 20 confirms, based on the information obtained in the processes of steps S1 and S2, whether the angular difference $\Delta\theta 1$, between the lane based on the map information of the distant section B and the information obtained by the cameras 41 of the distant section B, is continuously equal to or greater than a threshold T1. If it is determined that the angular difference $\Delta\theta 1$ is continuously equal to or greater than the threshold T1, the ECU 20 will advance the process to step S302. Otherwise, the process will advance to step S303. For example, in terms of the example shown in FIG. 3B, the ECU 20 will confirm whether the angular difference $\Delta\theta 1$ between the lanes ML2 and MR2 and the lanes CL2 and CR2 is continuously equal to or greater than the threshold T1. The threshold T1 may be, for example, 1.0° to 3.0°. More specifically, the threshold T1 may be 1.50.

In one embodiment, if a state in which the angular difference $\Delta\theta 1 \geq$ the threshold T1 has continued for a predetermined time, the ECU 20 may determine that the angular difference $\Delta\theta 1$ is continuously equal to or greater than the threshold T1. For example, if a state in which the angular difference $\Delta\theta 1$ is continuously equal to or greater than the threshold T1 has continued for 0.5 sec to 3 sec, the ECU 20 may determine that the angular difference $\Delta\theta 1$ is continuously equal to or greater than the threshold T1.

In addition, in one embodiment, in a case in which the vehicle 1 has continuously traveled for a predetermined distance in a state in which the angular difference $\Delta\theta 1 \geq$ the threshold T1, the ECU 20 may determine that the angular difference $\Delta\theta 1$ is continuously equal to or greater than the threshold T1. For example, the ECU 20 may determine that the angular difference $\Delta\theta 1$ is continuously equal to or greater than the threshold T1 in a case in which the vehicle has continuously traveled for 5 m to 30 m or more in a state in which the angular difference $\Delta\theta 1$ is equal to or greater than the threshold T1. Furthermore, in a case in which the vehicle has continuously traveled for a distance of 15 m or more in a state in which the angular difference $\Delta\theta 1$ is equal to or greater than the threshold T1, the ECU 20 may determine that the angular difference $\Delta\theta 1$ is continuously equal to or greater than the threshold T1.

Also, in one embodiment, in a case in which the angular difference $\Delta\theta 1$ of a portion, which is equal to or longer than a predetermined length of the lane of the distant section B, is equal to or greater than the threshold T1, the ECU 20 may determine that the angular difference $\Delta\theta 1$ is continuously equal to or greater than the threshold T1. In terms of the example shown in FIG. 3B, it can be determined that the angular difference $\Delta\theta 1$ is continuously equal to or greater than the threshold T1 in a case in which the length of a portion X, of the lane of the distant section B, where the angular difference $\Delta\theta 1$ is equal to or greater than the threshold T1, is equal to or longer than 5 m to 30 m.

In step S302, the ECU 20 determines that the map information and the information obtained by the cameras 41 of the distant section B are in an unmatched state, and ends this subroutine. In step S303, the ECU 20 determines that the map information and the information obtained by the cameras 41 of the distant section B are in a matched state, and ends this subroutine.

The processing of FIG. 5B will be described next.

In step S311, the ECU 20 confirms, based on the information obtained in the processes of steps S1 and S2, whether the angular difference $\Delta\theta 2$, between the lane based on the map information of the distant section A and the information obtained by the cameras 41 of the distant section A, is equal to or greater than a threshold T2. If it is determined that the angular difference is equal to or greater than the threshold, the ECU 20 will advance the process to step S312. Otherwise, the process will advance to step S313. For example, in terms of the example shown in FIG. 3C, the ECU 20 confirms whether the angular difference $\Delta\theta 2$ between the lanes ML3 and MR3 and the lanes CL3 and CR3 is equal to or greater than the threshold T2. In one embodiment, the threshold T2 may be, for example, 1.0° to 5.0°. More specifically, the threshold T2 may be, for example, 3.00.

In step S312, the ECU 20 determines that the map information of the nearby section A and the information obtained by the cameras 41 of the nearby section A are in an unmatched state, and ends the subroutine. In step S313, the ECU 20 determines that the map information of the nearby section A and the information obtained by the cameras 41 of the nearby section A are in a matched state, and ends the subroutine.

Comparing the processing of FIG. 5A and the processing of FIG. 5B, it can be seen that while the ECU 20 will determine that the map information and the information obtained by the cameras are in an unmatched state when the angular difference $\Delta\theta 2$ is equal to or greater than the threshold T2 in the nearby section A, the ECU 20 will determine that the map information and the information obtained by the cameras are in an unmatched state when the angular difference $\Delta\theta 1$ is continuously equal to or greater than the threshold T1 in the distant section B. As a result, the travel mode can be switched appropriately in accordance with the position where the map information and the information obtained by the cameras 41 do not match.

More specifically, by considering the continuity of the state of the angular difference $\Delta\theta 1$ the threshold T1 in the distant section B, it will be possible to suppress the influence of a detection error or the like occurring in the distant section B, in which there is greater possibility of detection accuracy degradation than in the nearby section A, and the switching of the travel mode will be able to be performed more appropriately. On the other hand, by switching the travel mode at an earlier timing in the nearby section A, it will be possible to ensure that the travel mode will be switched before the vehicle 1 arrives at a position where the map information and the cameras do not match.

In addition, in one embodiment, the threshold T2 of the nearby section A may be set to be greater than the threshold T1 in the distant section B. Since the continuity of the state in which the angular difference $\Delta\theta2 \geq$ the threshold T2 is not considered in the nearby section A, it will be possible to suppress a detection error or the like by setting the threshold T2 to be greater than the threshold T1.

Furthermore, in this embodiment, the ECU 20 determines whether the map information and the information obtained by the cameras 41 are in a matched state by confirming, with respect to both the left and right lanes, whether the angular difference between the lane based on the map information and the lane based on the information obtained by the cameras 41 are equal to or greater than a threshold. However, the determination may be performed by setting one of the left and right lanes as the target. Also, in one embodiment, the ECU 20 may perform the determination by targeting both the left and right lanes in the distant section B and perform the determination by targeting one of the left and right lanes in the nearby section A. As a result, it will be possible to perform a more accurate determination in the distant section B by targeting both the left and right lanes, and perform the determination at an earlier timing in the nearby section A by targeting only one of the lanes.

Figure 6:
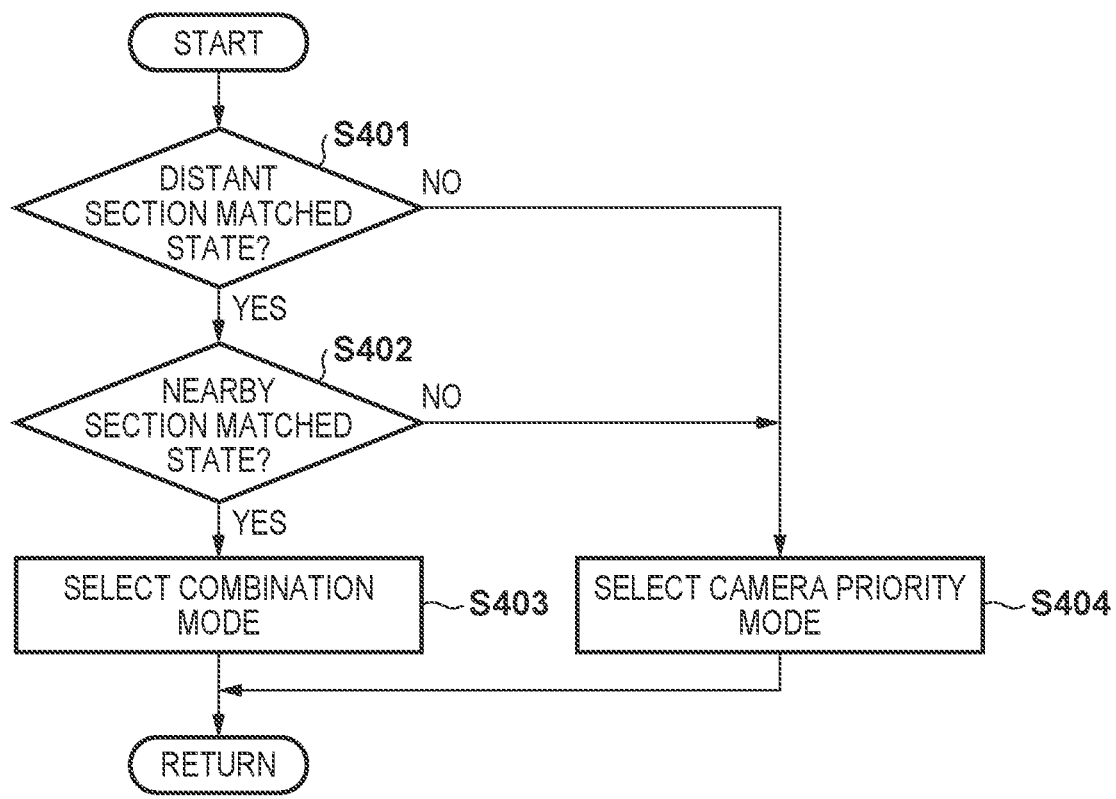
FIG. 6 is a flowchart showing an example of the processing of the control unit.

FIG. 6 is a flowchart showing the subroutine of the process of step S4 of FIG. 4.

In step S401, the ECU 20 confirms, based on the process of step S3, whether the map information of the distant section B and the information obtained by the cameras 41 of the distant section B are in a matched state. If it is determined to be in a matched state, the process advance to step S402. If it is determined to be in an unmatched state, the process advances to step S404.

In step S402, the ECU 20 confirms, based on the process of step S3, whether the map information of the nearby section A and the information obtained by the cameras 41 of the nearby section A are in a matched state. If a matched state is confirmed, the process advances to step S403. If an unmatched state is confirmed, the process advances to step S404.

In step S403, the ECU 20 selects the combination mode and ends the subroutine. In step S404, the ECU 20 selects the camera priority mode and ends the subroutine.

According to the processing of FIG. 6, the ECU 20 will select the combination mode in a case in which the map information and the information obtained by the cameras 41 are in a matched state in both the nearby section A and the distant section B. On the other hand, the ECU 20 will select the camera priority mode in a case in which the map information and the information obtained by the cameras 41 are in an unmatched state in at least one of the nearby section A and the distant section B.

As described above, in this embodiment, the control unit 2 determines whether the angular difference $\Delta\theta1$ is continuously equal to or greater than the threshold T1 in the distant section B, and determines whether the angular difference $\Delta\theta2$ is equal to or greater than the threshold T2 in the nearby section A. Subsequently, the control unit 2 performs, in accordance with these determination results, travel control prioritizing the lane recognition result based on the cameras 41. As a result, it will be possible to improve the accuracy of travel control performed in a case in which the information of the camera and the information of the map do not match.

Summary of Embodiment

The above-described embodiment disclose at least a travel control apparatus, a vehicle, a travel control method, and a non-transitory computer-readable program as follows.

1. A travel control apparatus (for example, 2) according to the above-described embodiment comprises
   a recognition unit (for example, 22, S1) configured to recognize, based on an image captured by a camera provided in a moving body, a lane on which the moving body is traveling;
   a control unit (for example, 20, S4) configured to perform, based on a recognition result of the recognition unit and map information of a periphery of the moving body, travel control of the moving body;
   a first determination unit (for example, 20, S301-S303) configured to determine whether a first state, in which a first angular difference (for example, $\Delta\theta1$), between a lane recognized by the recognition unit and a lane based on the map information, in a first range (for example, B) which is ahead of the moving body is continuously not less than a first threshold (for example, T1), is set; and
   a second determination unit (for example, 20, S311-S313) configured to determine whether a second state, in which a second angular difference (for example, $\Delta\theta2$), between a lane recognized by the recognition unit and a lane based on the map information, in a second range (for example, A) which is ahead of the moving body and is closer to the side of the moving body than the first range is not less than a second threshold (for example, T2), is set,
   wherein in at least one of a case in which the first determination unit determines that the first state is set and a case in which the second determination unit has determined that the second state is set, the control unit performs travel control prioritizing the recognition result of the recognition unit over the map information (for example, S401-S404).

According to this embodiment, the first determination unit and the second determination unit determine the state of the lane based on the map information and the information obtained by the cameras 41 under different conditions from each other. Hence, the control unit can select a more appropriate travel mode in accordance with the state of the road, and the accuracy of travel control performed when the map information and the information obtained by the cameras do not match can be improved.

2. In the above-described embodiment, the first determination unit and the second determination unit perform a determination by setting, as a target, at least one of left and right components (for example, L, R) forming a lane.

According to this embodiment, since the first determination unit and the second determination unit will perform a determination by setting, as a target, one of the left and right components, the determination can be performed more simply.

3. In the above-described embodiment, the first determination unit performs a determination by setting, as a target, both of left and right components forming a lane, and the second determination unit performs a determination by setting, as the target, one of the left and right components forming the lane.

According to this embodiment, since the first determination unit performs a determination by setting, as the target, both the left and right components, the determination can be performed more accurately in a distant section. Also, since the second determination unit performs a determination by setting, as the target, one of the left and right components, the determination can be performed at an earlier timing in a nearby section.

4. In the above-described embodiment, the left and right components forming the lane are division lines (for example, L, R) or road boundaries.

According to this embodiment, the determination can be performed by setting the division lines or the road boundaries as the target.

5. In the above-described embodiment, the first determination unit determines that the first state is set in one of a case in which the first angular difference is continuously not less than the first threshold of a predetermined time, a case in which the first angular difference is continuously not less than the first threshold while the moving body has traveled a predetermined distance, and a case in which the first angular difference of a portion (for example, X), which is not less than a predetermined length, of the lane is not less than the first threshold in the first range.

According to this embodiment, whether the first state is set can be determined in accordance with the traveled time of the moving body, the traveled distance of the moving body, or the length of the lane in which the first angular difference is equal to or greater than the first threshold.

6. In the above-described embodiment, the second threshold is greater than the first threshold.

According to this embodiment, since the second determination unit that performs a determination in a nearby section will not consider the continuity of the state in which the second angular difference is equal to or greater than the second threshold, the occurrence of a determination error or the like can be suppressed by setting the second threshold to be greater than the first threshold.

7. A vehicle (for example, 1) according to the above-described embodiment comprises a travel control apparatus (for example, 2) defined in 1, to 6, described above.

According to this embodiment, a vehicle in which the accuracy of travel control can be improved in a case in which the map information and the information obtained by a camera do not match can be provided.

8. A travel control method according to the above-described embodiment comprises:

recognizing (for example, S1), based on an image captured by a camera provided in a moving body, a lane on which the moving body is traveling;

performing (for example, S4), based on a recognition result obtained in the recognizing and map information of a periphery of the moving body, travel control of the moving body;

performing a first determination (for example, S301-S303) as to whether a first state, in which a first angular difference, between a lane recognized in the recognizing and a lane based on the map information, in a first range which is ahead of the moving body is continuously not less than a first threshold, is set; and performing a second determination (for example, S311-S313) as to whether a second state, in which a second angular difference, between a lane recognized in the recognizing and a lane based on the map information, in a second range which is ahead of the moving body and is closer to the side of the moving body than the first range is not less than a second threshold, is set, wherein in the performing the travel control, in at least one of a case in which a state in which the first state is set is determined in the performing the first determination and a case in which a state in which the second state is set is determined in the performing the second determination, travel control prioritizing the recognition result of the recognition unit over the map information is performed (for example, S401-S404).

According to this embodiment, a travel control method that can improve the accuracy of travel control in a case in which the map information and the information obtained by a camera do not match can be provided.

9. A non-transitory computer-readable storage medium according to the above-described embodiment stores a program for causing a computer to function as each unit of a recognition unit (for example, S1) configured to recognize, based on an image captured by a camera provided in a moving body, a lane on which the moving body is traveling;

a control unit (for example, S3) configured to perform, based on a recognition result of the recognition unit and map information of a periphery of the moving body, travel control of the moving body;

a first determination unit (for example, S301-S303) configured to determine whether a first state, in which a first angular difference, between a lane recognized by the recognition unit and a lane based on the map information, in a first range which is ahead of the moving body is continuously not less than a first threshold, is set; and a second determination unit (for example, S311-S313) configured to determine whether a second state, in which a second angular difference, between a lane recognized by the recognition unit and a lane based on the map information, in a second range which is ahead of the moving body and is closer to the side of the moving body than the first range is not less than a second threshold, is set, wherein in at least one of a case in which the first determination unit determines that the first state is set and a case in which the second determination unit has determined that the second state is set, the control unit performs travel control prioritizing the recognition result of the recognition unit over the map information (for example, S401-S404).

According to this embodiment, a non-transitory computer-readable storage medium that can improve the accuracy of travel control in a case in which the map information and the information obtained by a camera do not match can be provided.

The invention is not limited to the foregoing embodiments, and various variations/changes are possible within the spirit of the invention.

What is claimed is:

1. A travel control apparatus comprising:
a recognition unit configured to recognize, based on an image captured by a camera provided in a moving body, a lane on which the moving body is traveling;
a control unit configured to perform, based on a recognition result of the recognition unit and map information of a periphery of the moving body, a lane maintenance control in which the moving body is controlled to travel in a center of the lane;
a first determination unit configured to determine whether a first state, in which a first angular difference, between a lane recognized by the recognition unit and a lane based on the map information, in a first range which is ahead of the moving body is not less than a first threshold, is set; and
a second determination unit configured to determine whether a second state, in which a second angular difference, between a lane recognized by the recognition unit and a lane based on the map information, in a second range which is ahead of the moving body and is closer to the side of the moving body than the first range is not less than a second threshold, is set,
wherein the first determination unit is configured to determine that the first state is set under a condition that the first angular difference is continuously not less than the first threshold within a predetermined time or within a predetermined travel distance of the moving body,
wherein when the second angular difference is not less than the second threshold, the second determination unit is configured to determine that the second state is set at once,
wherein in at least one of a case in which the first determination unit determines that the first state is set and a case in which the second determination unit determines that the second state is set, the control unit performs the lane maintenance control prioritizing the recognition result of the recognition unit over the map information,
wherein the control unit is configured to request an occupant in the moving body to grip a steering wheel of the moving body when the control unit performs the lane maintenance control prioritizing the recognition result of the recognition unit over the map information,
wherein in a case in which the first determination unit does not determine that the first state is set and the second determination unit does not determine that the second state is set, the control unit performs the lane maintenance control based on the map information and the recognition result of the recognition unit in combination, and
wherein the control unit is configured not to request the occupant in the moving body to grip the steering wheel of the moving body when the control unit performs the lane maintenance control based on the map information and the recognition result of the recognition unit in combination.

2. The apparatus according to claim 1, wherein the first determination unit and the second determination unit perform a determination by setting, as a target, one of left and right components forming a lane.

3. The apparatus according to claim 2, wherein the left and right components forming the lane are division lines or road boundaries.

4. The apparatus according to claim 1, wherein
the first determination unit performs a determination by setting, as a target, both of left and right components forming a lane, and
the second determination unit performs a determination by setting, as the target, one of the left and right components forming the lane.

5. The apparatus according to claim 1, wherein the first range and the second rage partially overlap each other.

6. A vehicle comprising a travel control apparatus defined in claim 1.

7. A non-transitory computer-readable storage medium storing a program for causing a computer to function as each unit of a recognition unit configured to recognize, based on an image captured by a camera provided in a moving body, a lane on which the moving body is traveling;
a control unit configured to perform, based on a recognition result of the recognition unit and map information of a periphery of the moving body, a lane maintenance control in which the moving body is controlled to travel in a center of the lane;
a first determination unit configured to determine whether a first state, in which a first angular difference, between a lane recognized by the recognition unit and a lane based on the map information, in a first range which is ahead of the moving body is not less than a first threshold, is set; and
a second determination unit configured to determine whether a second state, in which a second angular difference, between a lane recognized by the recognition unit and a lane based on the map information, in a second range which is ahead of the moving body and is closer to the side of the moving body than the first range is not less than a second threshold, is set,
wherein the first determination unit is configured to determine that the first state is set under a condition that the first angular difference is continuously not less than the first threshold within a predetermined time or within a predetermined travel distance of the moving body,
wherein when the second angular difference is not less than the second threshold, the second determination unit is configured to determine that the second state is set at once,
wherein in at least one of a case in which the first determination unit determines that the first state is set and a case in which the second determination unit determines that the second state is set, the control unit performs the lane maintenance control prioritizing the recognition result of the recognition unit over the map information,
wherein the control unit is configured to request an occupant in the moving body to grip a steering wheel of the moving body when the control unit performs the lane maintenance control prioritizing the recognition result of the recognition unit over the map information,
wherein in a case in which the first determination unit does not determine that the first state is set and the second determination unit does not determine that the second state is set, the control unit performs the lane maintenance control based on the map information and the recognition result of the recognition unit in combination, and
wherein the control unit is configured not to request the occupant in the moving body to grip the steering wheel of the moving body when the control unit performs the lane maintenance control based on the map information and the recognition result of the recognition unit in combination.

8. A travel control method comprising:

recognizing, based on an image captured by a camera provided in a moving body, a lane on which the moving body is traveling;

performing, based on a recognition result obtained in the recognizing and map information of a periphery of the moving body, a lane maintenance control in which the moving body is controlled to travel in a center of the lane;

performing a first determination as to whether a first state, in which a first angular difference, between a lane recognized in the recognizing and a lane based on the map information, in a first range which is ahead of the moving body is not less than a first threshold, is set; and performing a second determination as to whether a second state, in which a second angular difference, between a lane recognized in the recognizing and a lane based on the map information, in a second range which is ahead of the moving body and is closer to the side of the moving body than the first range is not less than a second threshold, is set, wherein it is determined that the first state is set under a condition that the first angular difference is continuously not less than the first threshold within a predetermined time or within a predetermined travel distance of the moving body, wherein when the second angular difference is not less than the second threshold, it is determined at once that the second state is set, wherein in at least one of a case in which a state in which the first state is set is determined in the performing the first determination and a case in which a state in which the second state is set is determined in the performing the second determination, the lane maintenance control prioritizing the recognition result over the map information is performed, wherein requesting an occupant in the moving body to grip a steering wheel of the moving body is performed when the lane maintenance control prioritizing the recognition result of the recognition unit over the map information is performed, wherein in a case in which a state in which the first state is set is not determined in the performing the first determination and a state in which the second state is set is not determined in the performing the second determination, the lane maintenance control based on the map information and the recognition result in combination is performed, and wherein the requesting the occupant in the moving body to grip the steering wheel of the moving body is not performed when the lane maintenance control based on the map information and the recognition result in combination is performed.

* * * * *